Aug. 31, 1948.  D. R. DE BOISBLANC  2,448,323
DETONATION METER
Filed Aug. 9, 1944
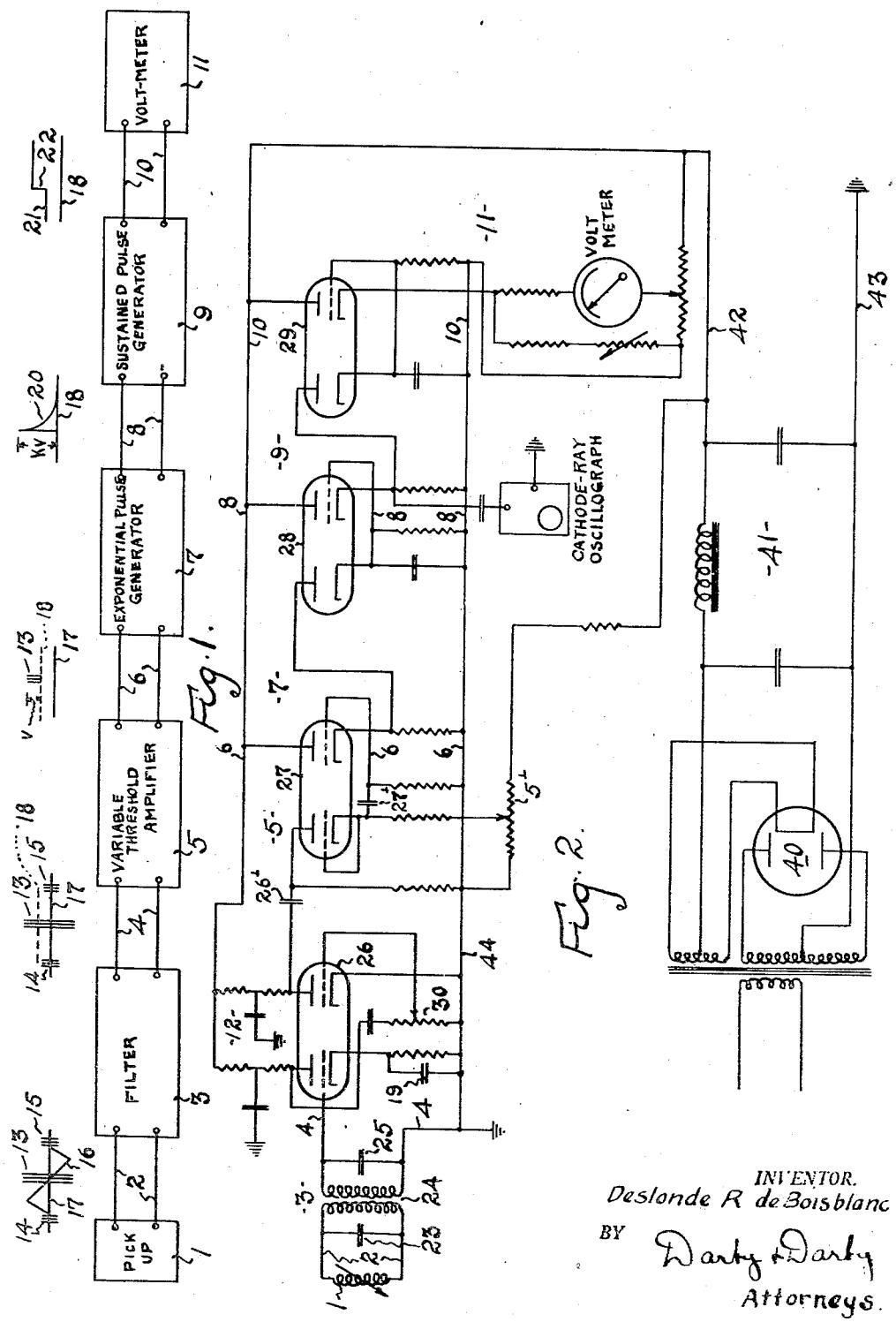
INVENTOR.
Deslonde R. de Boisblanc
BY Darby & Darby
Attorneys.

Patented Aug. 31, 1948

2,448,323

UNITED STATES PATENT OFFICE 2,448,323

DETONATION METER

Deslonde R. de Boisblanc, Bartlesville, Okla., assignor to Phillips Petroleum Company, a corporation of Delaware Application August 9, 1944, Serial No. 548,757

5 Claims. (Cl. 73—35)

This invention relates to electrical circuits for measuring peak voltages, and is particularly adapted for use as a detonation meter for measuring the peak detonation pressure in internal combustion engines.

The subject matter of this invention is related to the subject matter of copending application Serial No. 503,166 filed September 20, 1943, by Raymond G. Piety for Detonation meter, and my copending application Serial No. 524,502 filed February 29, 1944, for Detonation meter, and comprises a combination of portions of the apparatus and circuits of each to provide a simplified detonation meter capable of giving visual indications of peak detonation pressures.

An object of this invention is to replace or supplement the human ear as used in the prior art to determine when knocking of an internal combustion engine is taking place by an electronic apparatus not subject to differences between the ears of individuals nor human error.

Another object is to provide an electronic apparatus which will not only detect knocking but will indicate the degree of knock intensity.

Another object is to produce a detonation meter which will give the degree of knock intensity as a reading of the peak knock intensity over a short period.

A further object is to accomplish the above listed objects without introducing any new factors into the art of rating engine fuels while eliminating the possibility of error due to variations resulting when the human ear is used for this purpose.

The general objects of this invention are the same as in said application of Piety as set forth above with the added object of obtaining functional simplicity, reduced complexity of circuits and cost of manufacture.

The specific objects of the inventions and the improvements by means of which they are attained will be best understood in connection with the following detailed description of one embodiment of the invention explained herein in connection with the attached drawings.

This invention resides substantially in the combination, construction, arrangement and relative location of parts, all as will be described in detail below.

In the accompanying drawings,

Figure 1 is a diagrammatic view of the general combination of apparatus components comprising the subject matter of this invention including representations of the wave forms of the voltage pulses produced by each of the elements; and Figure 2 is a diagrammatic and schematic illustration of the apparatus represented more generally in the diagrammatic illustration of Figure 1.

The apparatus and method of this invention has been developed especially for the measurement of peak voltages generated by and in accordance with peak detonation pressures in internal combustion engines for the specific purpose of indicating the knock characteristics of such engines.

As is well understood, knocking in an internal combustion engine results when the explosive mixture detonates in an engine cylinder and large differences in pressure are generated within the cylinder. These pressure waves are converted into sound waves within the cylinder and are reflected back and forth until their energy is dissipated. These sound waves are modified by the sound wave components generated as a normal incident to the operation of internal combustion engines such as sound waves generated by the operation of the intake and exhaust valves of the engine and the pressure waves as a result of the normal operation of the engine.

The pressure variations in the cylinder of the engine are converted into electrical voltages by means of a pressure sensitive device, a number of which suitable for the purpose, are available. A very satisfactory voltage generator of this type is the magneto-striction pick-up of the Standard Oil Company of California. The voltage output of this pick-up is substantially proportional to the rate of change of pressure in the cylinder. Such a pick-up has been diagrammatically illustrated at 1 in the drawings, and the voltage output curve thereof, as illustrated in the first diagram of Figure 1, is a complex wave comprising a number of separate components, the most important of which have been illustrated in this diagram. The component 14 represents the noise of operation of the intake valves of the engine; component 15 represents the noise of operation of the exhaust valves of the engine; component 16 represents the pressure wave due to the normal burning of the combustible mixture; and component 13 represents the pressure component generated by detonation of the fuel mixture. The presence of explosion or detonation being manifest by audible "knock." It is this "knock" pressure component that this system measures. This diagram, as in the case of the other diagrams, is plotted on co-ordinates, of which the horizontal axis 17 represents time, and the vertical axis voltage values.

It is desirable therefore to remove components 14, 15 and 16 since they are of no interest within the purview of this invention. The output voltage of the pick-up 1 is therefore passed through a critically coupled band-pass filter resonant at about 6500 cycles per second. The wave form of the output voltage of this filter is illustrated in the next diagram, wherein it will be seen that the pressure component 16 has been filtered out. The output current of the filter is applied to the variable threshold amplifier 5 which is adjusted as conditions require so as to pass a voltage having values V above a certain minimum, as represented by the broken line 18. Thus the diagram of the output voltage of the amplifier 5 shows that the components due to the intake and exhaust valves 14 and 15 respectively have been suppressed, and only the portion of the incoming pressure waves above a preselected threshold value appear in the output of the amplifier as represented by the component 13 of this diagram having a voltage V. This component is a measure of the peak intensity of the detonations due to knocking and is applied to the input of the exponential pulse generator 7 which converts the voltage into one having a wave-form as illustrated in the next diagram and having an amplified voltage value as indicated of the voltage KV. The output of the exponential pulse generator 7 is, as illustrated in the diagram, of exponential form in which the curve of voltage decay is indicated at 20. The amplitude of these pulses will be proportional to the voltage V, as will be obvious to those skilled in the art. The output voltage of the generator 7 comprising these exponential pulses is applied to the input of a sustained pulse generator 9, which produces a voltage having the wave-form illustrated in the final diagram in which the normal output voltage of this generator is increased by an amount 22 proportional to the amplitude of the exponential pulse applied to the input of the sustained pulse generator 9. Thus the voltage fluctuation 22 is directly proportional to the intensity of the detonation representative of the knock, and when applied to a suitable voltmeter 11 such as a high speed critically damped vacuum tube voltmeter of known design will cause a deflection of the meter which may be visually observed. The nature of the output current of the sustained pulse generator is such that with a properly designed voltmeter the peak voltage values thereof can easily be read, and if the meter is properly calibrated it will give one skilled in the art a useful indication of the knocking characteristics of the fuel under test. It should be noted here that the pulse 22 is also of exponential form but that the time constant is deliberately chosen so as to give maximum ease of readability and yet fast enough to indicate closely spaced knocks.

A more detailed description of the apparatus components of the system will be given in connection with Figure 2. The pick-up 1 has been diagrammatically illustrated feeding a coupling transformer 24 forming part of the filter having its primary and secondary circuits tuned by means of the condensers 23 and 25 so that the unit forms a band-pass filter which, as previously stated, is preferably resonant at about 6500 cycles per second for the particular use of the apparatus under discussion.

The output of the filter is applied to the variable threshold amplifier 5 after amplification by means of any suitable form of vacuum tube amplifier. A suitable vacuum tube amplifier is illustrated as comprising two resistance coupled amplifiers in cascade connection. The multi-electrode vacuum tubes of this amplifier have been illustrated as a pair of triodes within a single envelope 26. The overall gain of this amplifier can be controlled in an obvious manner by means of potentiometer 30. A by-pass condenser 19 is included in the cathode circuit of the first triode for the purpose of increasing the gain of the amplifier by preventing negative degeneration. The combination of resistors and capacitors 12 comprise decoupling filters in the output circuits for the purpose of maintaining the desired coupling conditions in these output circuits. It is, of course, apparent that other suitable forms of voltage amplifiers may be employed, and of course, separate triodes can be employed if desired.

It is likewise apparent that this voltage amplifier may be considered a part of the filter 3 or a part of the amplifier 5. The output of the second triode of the voltage amplifier is applied through the coupling condenser 26' to a variable threshold amplifier 5 comprising the left hand triode of the combination vacuum tube 27, diode connected. The potentiometer 5' controls the voltage level at which this diode conducts, and therefore predetermines the threshold of operation of the amplifier, or in other words, prevents the amplifier from passing a signal whose voltage does not exceed the value 18, which is diagrammatically illustrated in Figure 1. The output of the amplifier 5 is applied to a coupling condenser and coupling resistors as shown in accordance with common practice in the electronic arts to the exponential pulse generator 7 which includes the right hand triode of the multiple vacuum tube 27 and the diode of the multiple vacuum tube 28. The condenser 27' is a conventional coupling condenser employed to eliminate direct current bias introduced by the amplifier 5. The output of this diode or exponential pulse generator has a voltage wave form 20, as illustrated in Figure 1, and is applied to the sustained pulse generator comprising the right hand triode of the multiple vacuum tube 28 and the diode of the multiple vacuum tube 29. The cathode ray oscillograph is diagrammatically illustrated connected in the circuit at the proper point for increasing the utility of the circuit, but its use is not essential to the subject matter of this invention. The sustained pulse generated by the generator 9 is then applied to the vacuum tube voltmeter which includes the triode at the right hand end of the multiple vacuum tube 29.

In the operation of the sustained pulse generator the resistance and condenser combination of tube 29 is quickly changed by the rise in the output voltage 20 of the generator 7. As the condenser of this combination cannot discharge back through the diode comprising the lefthand portion of tube 29, it is forced to discharge through the associated resistance which is sufficiently large so that the pulse 22 is an exponential pulse of sufficiently long decay time to provide ease of readability and yet be fast enough to indicate closely spaced knocks. Thus, although this pulse 22 is an exponential pulse its decay time is sufficiently long so that it approaches a square pulse, as indicated in the drawings when plotted on the same time scale as the pulse 20.

At this point it may again be emphasized that the various circuits may be grouped in other ways and the individual vacuum tubes may be single devices or multiple devices, as illustrated, but grouped in other combinations. For example, the right hand triode of the tube 27 and the diode of the tube 28 may be enclosed in the same evacuated vessel and the triode of tube 28 and the diode of tube 29 could be grouped in the same vacuum vessel. These variations represent practical considerations involving questions of economy and space which have no bearing on the novel subject matter of this invention.

It is not necessary to describe the vacuum tube voltmeter in detail since it may take other forms than that illustrated in the drawings, its sole function being to indicate the voltage change 22 applied thereto by the sustained pulse generator 9. The grounded cathode circuit for the various tubes is shown at 44. The apparatus is powered by means of a suitable power pack of well known form, including full wave vacuum tube rectifier 40 and a suitable filter circuit 41. The output of this power pack is applied on its negative side to ground through the connection 43 and its positive side through the connection 42 to the plate of the various vacuum tubes as shown. The various other circuit elements illustrated but not specifically mentioned perform functions apparent to those skilled in the art in view of the nature of the apparatus and the desired voltage wave forms of the currents produced thereby, all as described above.

In view of the foregoing description it will be clear that the system herein disclosed produces a final current having a voltage wave form as illustrated in the last diagram of Figure 1 from the output current of the pickup 1 having the voltage wave form illustrated in the first diagram. The wave form of the final output current is suitable for the operation of a voltmeter adapted to measure peak voltage intensities, which peak voltage intensities in this case are representative of, and are generated by and in accordance with pressure variations in the cylinder of an internal combustion engine resulting when the engine is knocking.

It is to be understood that the embodiment of the invention herein illustrated is capable of considerable detail variation by those skilled in the art without departure from the substance of the invention, and I do not, therefore, desire to be strictly limited to the disclosure given herein in an illustrative sense, but rather by the claims granted me.

What is claimed is:

1. In a detonation meter, the combination comprising pickup means for converting pressure variations in the cylinder of an internal combustion engine into electrical voltages representative thereof, said voltages including unwanted components and components representative of detonation, means for filtering said electrical voltages to attenuate said unwanted components, means for feeding the entire output of said pickup means to said filtering means, an amplifier for increasing the amplitude of the filtered voltages without appreciably changing their wave form, means for feeding the entire output of said filtering means to said amplifier a threshold device fed directly by said amplifier and receiving the entire output thereof said threshold device eliminating components of the amplified voltages which are below a predetermined amplitude, said predetermined amplitude being intermediate the peak amplitude of the detonation components and the peak amplitude of said unwanted components in the output of said amplifier, a pulsing circuit fed by said threshold device for converting the output thereof into exponential pulses, a second circuit for converting the exponential pulses into sustained pulses, and means for measuring said sustained pulses.

2. In a detonation meter, the combination comprising pickup means for converting pressure variations in the cylinder of an internal combustion engine into electrical voltages representative thereof, said voltages including unwanted components and components representative of detonation, means for filtering said electrical voltages to attenuate said unwanted components, means for feeding the entire output of said pickup means to said filtering means, an amplifier for increasing the amplitude of the filtered voltages without appreciably changing their wave form, means for feeding the entire output of said filtering means to said amplifier, a threshold device fed directly by said amplifier and receiving the entire output thereof, said threshold device eliminating components of the amplified voltages which are below a predetermined amplitude, said predetermined amplitude being intermediate the peak amplitude of the detonation components and the peak amplitude of said unwanted components in the output of said amplifier, a pulse generating circuit comprising a condenser and a resistor for slowly discharging said condenser, whereby said circuit produces spaced, exponential pulses in response to the voltage components passed by said threshold device, a second pulse generating circuit fed by said first circuit including a second condenser and a second resistor for slowly discharging said condenser, the time constant of the second resistance-capacitance unit being substantially higher than the time constant of the first unit, and a voltmeter for measuring the output of said second pulse generating circuit.

3. In a detonation meter, the combination comprising pickup means for converting pressure variations in the cylinder of an internal combustion engine into electrical voltages representative thereof, said voltages including unwanted components and components representative of detonation, means for filtering said electrical voltages to attenuate said unwanted components, means for feeding the entire output of said pickup means to said filtering means, an amplifier for increasing the amplitude of the filtered voltages without appreciably changing their wave form, said amplifier including a tube having an anode, a cathode, and a control grid, means for feeding the entire output of said filtering means to the control grid of said tube, a threshold device for eliminating components of the amplified voltages which are below a predetermined amplitude, said predetermined amplitude being intermediate the peak amplitude of the detonation components and the peak amplitude of said unwanted components in the output of said amplifier, conductor means directly coupling the anode of the amplifier tube to the input circuit of said threshold device, a pulsing circuit fed by said threshold device for converting the output thereof into exponential pulses, a second circuit for converting the exponential pulses into sustained pulses, and means for measuring said sustained pulses.

4. In a detonation meter, the combination comprising means for converting pressure variations in the cylinder of an internal combustion engine into electrical voltages representative thereof.

said voltages including unwanted components and components representative of detonation, means for filtering said electrical voltages to attenuate said unwanted components, means for feeding the entire output of said pickup means to said filtering means, an amplifier fed by said filter for increasing the amplitude of the filtered voltages without appreciably changing their wave form, said amplifier including an electron tube having an anode, a cathode, and a control grid, means for feeding the entire output of said filtering means to the control grid of said tube, a threshold device comprising a biased tube including an anode and a cathode for eliminating components of the amplified voltages which are below a predetermined amplitude, said predetermined amplitude being intermediate the peak amplitude of the detonation components and the peak amplitude of said unwanted components in the output of said amplifier, conductor means directly coupling the anode of the amplifier tube with the anode circuit of the biased tube, a pulsing circuit fed by said threshold device for converting the output thereof into exponential pulses, a second circuit for converting the exponential pulses into sustained pulses, and means for measuring said sustained pulses.

5. In a detonation meter, the combination comprising means for converting pressure variations in the cylinder of an internal combustion engine into electrical voltages representative thereof, said voltages including unwanted components and components representative of detonation, means for filtering said electrical voltages to attenuate said unwanted components, means for feeding the entire output of said pickup means to said filtering means, an amplifier fed by said filter for increasing the amplitude of the filtered voltages without appreciably changing their wave form, said amplifier including an electron tube having an anode, a cathode, and a control grid, means for feeding the entire output of said filtering means to the control grid of said tube, a threshold device comprising a biased tube including an anode and a cathode for eliminating components of the amplified voltages which are below a predetermined amplitude, said predetermined amplitude being intermediate the peak amplitude of the detonation components and the peak amplitude of said unwanted components in the output of said amplifier, conductor means directly coupling the anode of the amplifier tube with the anode circuit of the biased tube, a first pulsing circuit comprising a unit including an energy storage device and means for discharging said energy storage device whereby said circuit produces spaced exponential pulses in response to the current passed by said threshold device, a second pulsing circuit fed by said first circuit comprising a unit including a second energy storage device and means for slowly discharging said storage device, the time constant of the second unit being substantially higher than the time constant of the first unit, and means including a voltmeter responsive to the pulses produced by said second circuit.

DESLONDE R. DE BOISBLANC.

REFERENCES CITED

The following references are of record in the file of this patent:

UNITED STATES PATENTS

| Number | Name | Date |
| --- | --- | --- |
| 1,907,415 | Carpenter et al. | May 2, 1933 |
| 1,916,404 | Barton | July 4, 1933 |
| 2,113,214 | Luck | Apr. 5, 1938 |
| 2,269,760 | Eldredge | Jan. 13, 1942 |
| 2,319,219 | Draper et al. | May 18, 1943 |
| 2,337,522 | Eldredge | Dec. 21, 1943 |
| 2,340,714 | Traver et al. | Feb. 1, 1944 |

FOREIGN PATENTS

| Number | Country | Date |
| --- | --- | --- |
| 504,509 | Great Britain | Apr. 26, 1934 |
| 524,130 | Great Britain | July 30, 1940 |